(12) United States Patent
Iliev

(10) Patent No.: US 10,880,406 B2
(45) Date of Patent: Dec. 29, 2020

(54) CONTROLLING ACCESS TO DATA RESOURCES ON HIGH LATENCY NETWORKS

(71) Applicant: MASTERCARD INTERNATIONAL INCORPORATED, Purchase, NY (US)

(72) Inventor: Issidor L. Iliev, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/293,346

(22) Filed: Mar. 5, 2019

(65) Prior Publication Data

US 2020/0287994 A1      Sep. 10, 2020

(51) Int. Cl.
| | | |
|---|---|---|
| *G06F 15/16* | (2006.01) | |
| *H04L 29/06* | (2006.01) | |
| *H04W 76/10* | (2018.01) | |
| *H04L 29/08* | (2006.01) | |

(52) U.S. Cl.
CPC .............. *H04L 67/42* (2013.01); *H04L 67/10* (2013.01); *H04W 76/10* (2018.02)

(58) Field of Classification Search
CPC ......... H04L 67/42; H04L 67/10; H04W 76/10
See application file for complete search history.

(56) References Cited

U.S. PATENT DOCUMENTS

| | | | |
|---|---|---|---|
| 9,501,227 B2 | 11/2016 | Wang et al. | |
| 9,535,756 B2 | 1/2017 | Depner et al. | |
| 9,602,377 B2 | 3/2017 | Agarwal et al. | |
| 9,665,290 B2 | 5/2017 | Wang et al. | |
| 9,852,071 B2 | 12/2017 | Bronson et al. | |
| 10,015,086 B2 | 7/2018 | Kadle et al. | |
| 10,057,332 B2 | 8/2018 | Bragstad et al. | |
| 10,061,724 B2 | 8/2018 | Davda et al. | |
| 10,102,133 B2 | 10/2018 | Pack, III | |
| 10,120,594 B1 | 11/2018 | Hardt et al. | |
| 10,142,406 B2 | 11/2018 | Suryanarayanan et al. | |
| 10,146,681 B2 | 12/2018 | Guim Bernat et al. | |
| 10,152,239 B1 | 12/2018 | Tamilmani | |
| 10,191,868 B2 | 1/2019 | Svendsen et al. | |
| 2011/0225120 A1* | 9/2011 | Cooper ................. | G06F 16/273 707/610 |

(Continued)

*Primary Examiner* — Ryan J Jakovac
(74) *Attorney, Agent, or Firm* — Armstrong Teasdale LLP

(57) ABSTRACT

A DACD for controlling access to data resources in a high latency network is provided. The DACD includes a high latency network interface for connecting with a remote network, and a local network interface for connecting with a local network. Communications with the local network have a lower latency than communications with the remote network. The DACD is programmed to receive using the local network interface a request including a resource identifier that identifies a data resource which may be safely accessed by at most one server device at a time, query an activation database on the local network with the resource identifier to determine that the resource identifier is in a deactivated status, broadcast using the high latency network interface a broadcast request that includes the resource identifier, and update the activation status for the resource identifier in the database to an activated status for the local network.

20 Claims, 10 Drawing Sheets

(56) References Cited

U.S. PATENT DOCUMENTS

| | | | |
|---|---|---|---|
| 2014/0222886 A1* | 8/2014 | Thompson | G06F 9/542 |
| | | | 709/201 |
| 2016/0246834 A1* | 8/2016 | Regni | G06F 16/2343 |
| 2018/0317247 A1* | 11/2018 | Chongoushian | H04L 5/0064 |
| 2018/0359670 A1* | 12/2018 | Fang | H04W 36/08 |
| 2019/0354539 A1* | 11/2019 | Schmidt | G06F 16/2282 |

* cited by examiner

CONTROLLING ACCESS TO DATA RESOURCES ON HIGH LATENCY NETWORKS

BACKGROUND

This disclosure relates generally to network latency management, and more specifically, to controlling access to data resources in a high latency network environment.

Network latency is the time it takes to transmit data between computing devices. More specifically, it is the time between data being transmitted at one device, and received at a second device. Network latency is influenced by multiple factors, including networking technology and physical distance. Generally, as physical distance increases, network latency also increases. Long distance networks may be defined by persistently high latency, and extraterrestrial networks are particularly associated with high latency.

Multiple computing devices processing the same data resource at the same time may result in data corruption or inconsistencies in the data, especially when the multiple computing devices are distributed in different locations with a significant distance between such locations. Thus, it is necessary to control access to data resources in such distributed computing systems. However, coordinating access to data resources by multiple computing devices is difficult in especially high latency networks, where the computing devices are separated by long distances. For example, some systems may require multiple messages for each access to a data resource, leading to high processing times from the network latency.

There is a need for a system to control access to data resources on high latency networks.

BRIEF DESCRIPTION

In one aspect, a distributed access computing device (DACD) for controlling access to data resources in a high latency network is provided. The DACD includes a high latency network interface connecting the DACD with a remote network wherein the remote network includes at least one external DACD; a local network interface connecting the DACD with a local network wherein the local network includes at least one server and at least one client computing device wherein communications with the local network have a lower latency than communications with the remote network; (c) a processor; and (d) a memory in communication with the processor. The processor is programmed to (i) receive, using the local network interface, a request including a resource identifier wherein the resource identifier identifies a data resource which may be safely accessed by at most one server computing device at a time, (ii) query an activation database on the local network with the resource identifier to determine that the resource identifier is in a deactivated status for the local network, and (iii) broadcast, using the high latency network interface, a broadcast request to the at least one external DACD wherein the broadcast request includes the resource identifier. The processor is further programmed to (iv) update the activation status for the resource identifier in the database to an activated status for the local network after receiving an activation transfer message from the remote network.

In another aspect, a non-transitory computer readable storage media having computer-executable instructions embodied thereon is provided. The computer-executable instructions are executable by a DACD having a processor coupled to a memory. When executed by the processor, the instructions cause the processor to (i) receive, using a local network interface, a request including a resource identifier wherein the resource identifier identifies a data resource which may be safely accessed by at most one server computing device at a time on the local network, (ii) query an activation database on the local network with the resource identifier to determine that the resource identifier is in a deactivated status for the local network, (iii) broadcast, using a remote network interface, a broadcast request to the at least one external DACD wherein the broadcast request includes the resource identifier, and (iv) update an activation status for the resource identifier in the activation database to an activated status for the local network after receiving an activation transfer message from the remote network.

In yet another aspect, a distributed access computing system for controlling access to data resources in a high latency network is provided. The distributed access computing system includes a first DACD having a local network interface connecting the first DACD with a first local network wherein the local network includes at least one server and client computing device; a second DACD having a local network interface connecting the second DACD with a second local network wherein the local network includes at least one server and client computing device; and a remote network interface of the first DACD connecting the first DACD and the second DACD. The first DACD includes a processor and a memory in communication with the processor. The processor is programmed to (i) receive, from the first local network a request that includes a resource identifier wherein the resource identifier identifies a data resource which may be safely accessed by at most one server computing device at a time, (ii) query an activation database on the first local network with the resource identifier to determine that the resource identifier is in a deactivated status for the local network, (iii) broadcast, using the remote network interface, a broadcast request to the second DACD wherein the broadcast request includes the resource identifier, and (iv) update an activation status for the resource identifier in the activation database to an activated status for the first local network after receiving an activation transfer message from the remote network.

DETAILED DESCRIPTION

Figure 1:
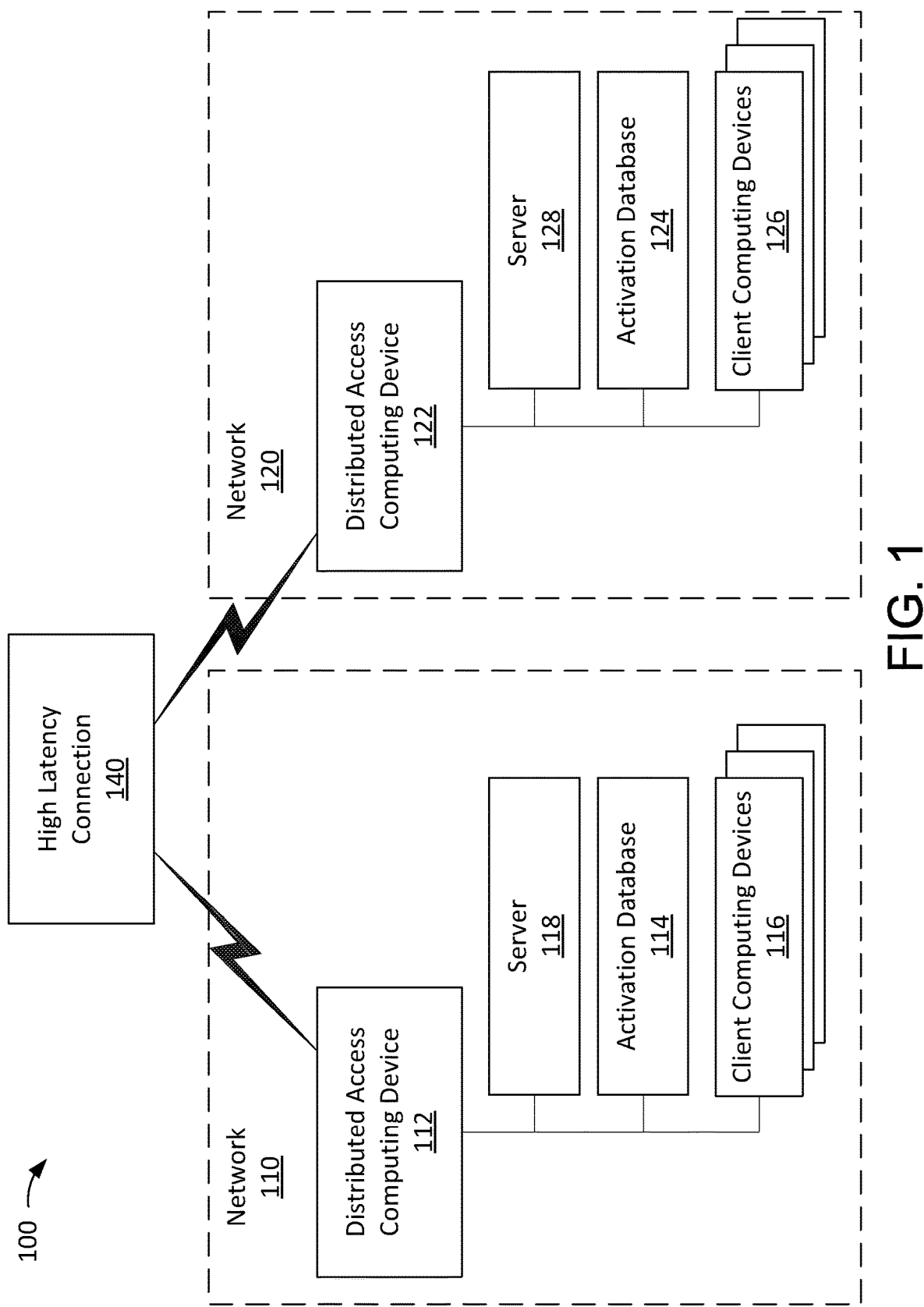
FIG. 1 is a schematic diagram illustrating an example distributed access computing device (DACD) system in accordance with the present disclosure.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

Distributed computing, that is, the use of multiple computing devices ("servers") in coordination, is frequently employed to increase the processing throughput of computing systems. Multiple servers may be used to simultaneously process incoming requests. Additionally, servers may be located in specific regions to decrease the latency for client computing devices in each such region. The distance between a server and the client computing device generally influences the data network latency (e.g., the delay between data transmitted from one device and received at another). Therefore, it may be desirable to have at least one server in each general region where there are connected client devices that require access to a server.

A requests/resources model is described herein when describing the operation of client and server computing devices. This model may also be described as a general API (application programming interface) framework, or a RESTful (representational state transfer) API design pattern. In the request/resources model, client computing devices transmit requests to a server computing device, which executes stored computing code and accesses data resources to generate respective responses. The stored computing code, generally, implements operational logic to modify stored data resources. Servers require access to one or more data resources to process a request. Although this patent application uses the request/resources model to illustrate a latency management system, the systems and processes described herein are not limited to this model. Rather, it is used for example purposes, and the systems and processes described herein can be used in a number of different applications.

Data resources are challenging to scale and organize within a distributed computing system. As used herein, "data resources" refer generally to database records in a database system, or other forms of mutable data. The mutability of data resources prevents direct concurrent access by multiple computing devices (e.g., servers processing requests). For example, a first server may attempt to read a data resource while a second server is modifying the data resource, resulting in corrupted (e.g., unintelligible, incorrect, improperly formatted) data.

At least some distributed computing systems attempt to address these technical problems by controlling access to the data resources. For example, these known systems may include two servers each attached to a unique local network of client computing devices. The two local networks may be isolated. As used herein, "isolated" generally refers to two data networks that are connected only by a high latency connection, and any communication between the networks experiences, at a minimum, generally high latency. For example, a high latency satellite connection may be the only link between the two local networks. Data communication between the two networks must traverse the high latency satellite connection, and thus incur the latency associated with the connection.

In this example, if each server maintains a local copy of the data resources needed to process requests, then each server will quickly become out of sync with the other. The advantages of having multiple servers (e.g., parallel processing of requests) are lost because each server processes requests without the knowledge of the other. More specifically, the results of operations will not be consistent between the servers. For example, a data resource could have different values at the different servers.

In this same example, if a single copy of the data resources is shared between the two servers, then the advantages of the distributed system (e.g., reduced latency at client computing devices) are significantly impacted because latency is increased. Each server must access the shared data resources, limiting parallel processing of requests and eliminating the benefit of local servers, as requests are ultimately dependent on the centralized data resources. For example, the processing time of requests may be increased as servers access the shared data resources.

The technical problem of controlling access to data resources in a distributed computing system requires advanced and specialized solutions. One known solution to this problem includes caching a local copy of the data resources at each server, and periodically synchronizing any changes made to the data resources by either server. Another known solution is to partition the data resources, so that at least one request can be processed locally. These known solutions may be adequate for networks with low to moderate levels of network latency (e.g., under 5 milliseconds). However, these solutions are inadequate for distributed computing systems limited by high latency connections (e.g., over 5 ms). More specifically, these known solutions may congest the high latency connection, and the servers may experience high processing delays from repeated use of the high latency connection. In addition, parallel access by several server computing devices to local copies of data resources may still lead to inconsistent results of operations between the servers if two or more servers make changes to the data resource without knowledge of each other in-between data synchronization cycles.

The systems and processes described herein include a distributed access computing device (DACD) which is used to mitigate the technical problems of high network latency and control access to data resources in a distributed computing system.

Multiple DACDs establish a "super-network" (e.g., the DACD system, a "network of networks", "peer to peer network", "distributed network"). Each DACD is connected to a local network (e.g., via a network interface), having any number of servers (e.g., computing devices processing requests and generating responses) and client devices (e.g., computing devices generating requests). Generally, the communication between each local network is restricted by high network latency. The DACD super-network includes high latency connections between local networks, such as satellite links.

The servers in each local network require access to data resources to process requests received from client computing devices. The DACD is configured to prevent multiple servers on different local networks (e.g., only connected by a high latency connection) from simultaneously accessing the same data resource and/or from performing conflicting operations associated with the same data resource. In other words, the DACD system controls access to data resources in a high latency network.

The DACD controls access to data resources at the network level. In other words, at most one local network may be activated for a data resource at one time. The servers on the activated local network may safely access the data resource. The DACD system controls the activation status for data resources at each local network. More specifically, each DACD in the system determines an activation status for each data resource, and the activation status is specific to the local network of the DACD.

Various embodiments of local networks connected by high latency connections are considered. Local networks may be established, for example, on shipping vessels, cruise ships, aircraft, spacecraft, and the like. Local networks established on these large vehicles may be connected to another local area network (e.g., a corporate network, the internet) by a high latency connection (e.g., a satellite connection). Local networks may also be established in remote areas, such as areas without existing data network infrastructure. For example, remote worksites in arctic areas may establish a local area network. In another example, a local network may be established in extraterrestrial settings. Local networks may be established on astronomical bodies, such as Mars and the Earth's Moon. Local networks in these remote areas may be connected back to terrestrial networks by satellite networks.

For example, a local area network may include networking computing devices established on another planet, where connections back to Earth are limited by high latency (e.g., 5 seconds to 1 minute) connection through a satellite data connection. The local area network may be a traditional internet-protocol based network, including any number of computing devices, such as servers, laptop computers, digital appliances, and the like.

Unlike previous latency management systems, the DACD system controls access to data resources at the network level. The DACD enables at most one local network, and its connected servers, to access/modify a data resource at a time. In other words, existing latency management systems may operate within a local network, while the DACD operates at the "super-network" level. Overall, the DACD system is organized such that it does not disrupt existing distributed computing system technologies within the local network.

The general operation of a single DACD is as follows. In one embodiment, a server receives a request from a client computing device, and queries the DACD (e.g., on the local network) to determine whether the server may access necessary data resources. In other words, servers may forward requests including resource identifiers to the DACD. In another embodiment, the DACD receives requests from client devices and controls access to the data resources before forwarding the request to the server. Overall, the DACD receives a request including at least one resource identifier, and controls access to the associated data resources.

In the example embodiment, the DACD receives a request, including an identifier of a data resource (e.g., a resource identifier). The request may be a request received from a client computing device before processing by a server, or the request may be received from a server during processing of a request. The DACD is configured to automatically identify any number of resource identifiers in the request, and may process any type of request (e.g., payment card transaction messages, authorization messages, ISO 8583 messages, etc.).

Figure 2:
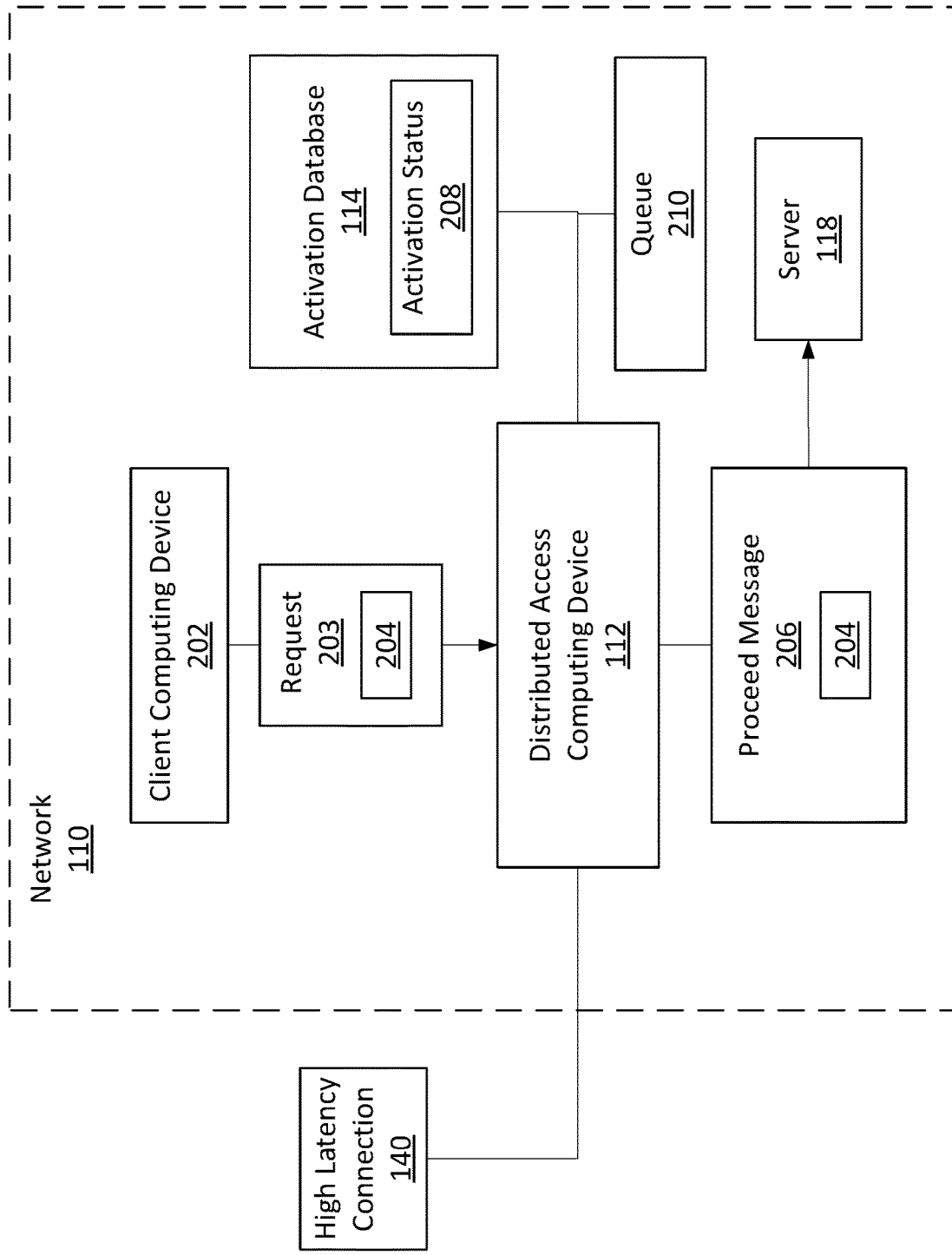
FIG. 2 is a simplified block diagram illustrating processing requests processed by the DACD system shown in FIG. 1.

The DACD is configured to determine if the local network is activated for the specific resource identifier. In the example embodiment, the DACD queries a database on the local network to determine the activation status for the resource identifier. If the activation status stored in the local database indicates the resource identifier, and thus the associated data resource, is enabled, then the DACD generates a proceed response, and enables further processing of the initial request on the local network, as shown in FIG. 2.

If, however, the activation status on the local network for the resource identifier is disabled, then the local DACD attempts to obtain activation for the resource identifier. The local DACD transmits a broadcast request to obtain activation status for the resource identifier (e.g., a broadcast request) using, at least, the high latency network connection (e.g., via a "remote" network interface of the DACD connecting the DACD to a higher latency network). The broadcast request is transmitted to all other DACDs ("external DACDs") and includes the resource identifier.

The local DACD subsequently receives an activation transfer from an external DACD, indicating the local DACD is cleared to change the activation status for the resource identifier on the local network to enable.

The DACD may generate a proceed response, enabling processing of requests associated with the data resource on the local network by any of the connected servers.

If the DACD receives a broadcast request, it determines the activation status for the resource associated with the resource identifier included in the broadcast request on the network local to the DACD. If the resource identifier is enabled for the local network, the DACD is configured to change the activation status of the resource to disabled on that local network, and transmit an activation transfer to the external DACD that generated the broadcast request. The activation transfer indicates that the only network with enabled activation status for the resource identifier has now been deactivated, and the requesting DACD is clear to activate its local network for the resource identifier and the associated data resource.

If, however, the resource identifier for the data resource is disabled for the local network, the DACD does not respond to the broadcast request. In other words, the DACD obtains activation status for the resource identifier when necessary, and subsequently transmits a proceed message to the server, where the proceed message initiates processing of the request dependent on the resource identifier at the server.

The DACD system is particularly suited, for example, to networks that are configured to process payment transactions including payment card transactions. The payment processing networks used to process payment transactions are configured to process transaction messages using primary account numbers (PANs). PANs may be considered a resource identifier for the associated payment account. Payment accounts may also be considered data resources. For example, a payment account may be implemented as a collection of database records related by a PAN. The data resource (e.g., the payment account) may include database records across multiple databases, but they are generally related by the PAN.

Payment processing networks include multiple types of requests including transaction authorization request messages, identity verification requests, fraud scoring requests, clearing and settlement messages, and the like. Generally, these requests include a PAN associated with the account being used to make the purchase as the resource identifier, and the associated payment account status may be the data resource. The DACD is configured to control access based on the PAN, and the DACD is not dependent on the specific structure/context of the request. The DACD does not need to be configured/initialized for each type of request being processed by the distributed computing system (e.g., a payment card network). In other words, the DACD is configured to process requests including transaction authorization messages, identity verification requests, and fraud scoring requests. The DACD is configured to automatically process multiple types of requests by automatically identifying resource identifiers (e.g., PANs) in the requests. The high volume of payment transactions necessitates parallel processing of requests by multiple servers. Additionally, payment card users expect their payment accounts to be accessible by merchants in virtually all locations.

At least two latency issues are associated with payment networks. First, consumers and merchants generating requests (e.g., transactions, authorization requests) may have a low tolerance for delays in processing these requests. These delays may reduce the number of transactions (e.g., sales) a merchant can complete. Second, at higher latency levels, a "double spend" problem may arise for these payment networks. This "double spend" problem may arise, for example, when a transaction that would exceed the authorization limit of an account if executed twice is authorized at two different local networks without the knowledge of each other due to high latency.

In one aspect, the DACD system is a latency management system. In particular, the systems and methods of this disclosure reduce network latency. At least some known networked computer systems may be ill-suited for networks including high latency connections (e.g., satellite connections). For example, these known computer systems may repeatedly transmit data across the high latency network while processing requests, causing significant delays. These known systems may operate without considering the high latency connection, resulting in unnecessary use of the high latency connection.

The systems and methods of this disclosure reduce network latency by controlling when high latency network connections are utilized. More specifically, the DACD system processes requests (e.g., access data resources) using relatively low latency local networks, and makes judicial use of high latency connections to coordinate the local networks when necessary. Rather than relying on high latency connections to access/transmit data resources, the DACD system uses the high latency connections as needed to control access to data resources stored on local networks.

The DACD system controls access to data resources at the network level, which further reduces network latency. Once a particular local network has been activated for a specific data resource, additional requests dependent on the data resource may be processed without utilizing the costly high latency connection. In other words, the high latency connection is only utilized when necessary, and otherwise multiple requests can be processed on the local network without using the high latency connection.

In one embodiment, the DACD system is a component of a payment network processing payment card transactions. At least some known payment networks may process payment card transactions (e.g., requests) without considering the impact of high latency connections (e.g., satellite data connections). For example, transmitting payment card transactions over a high latency connection may lead to transaction processing delays. Consumers may have a low tolerance for transaction processing delays.

In this embodiment, the DACD system processes payment card transactions using relatively low latency local networks, and uses the high latency connections as necessary to coordinate access to data resources (e.g., payment card accounts). Additionally, the DACD system is configured such that multiple payment card transactions on the same local network will not require multiple uses of high latency network connections. For example, after a payment card identifier (e.g., resource identifier) is activated for a local network, subsequent requests (e.g., payment card transactions) associated with the payment card identifier may be processed on the local network without depending on the high latency connection. This both reduces network latency (e.g., the time to process a request), and reduces traffic (e.g., network congestion) on a potentially expensive high latency network connection (e.g., a satellite data connection).

The technical problems addressed by this disclosure include at least one of: (i) data corruption due to multiple server computing devices accessing the same data resource at about the same time, (ii) processing delays due to high latency networks, (iii) incorrectly processing requests due to multiple computing devices accessing the same data resource at one time, (iv) processing delays due to multiple high latency messages being required to access a shared data resource, (v) network latency, and (vi) remote computing devices being unable to access data resources due to high network latency, more generally, the ordering problem.

The systems and methods of the disclosure are implemented using computer programming or engineering techniques including computer software, firmware, hardware, or any combination or subset thereof, wherein the technical effects are achieved by at least: (i) receiving, using the local network interface, a request including a resource identifier, the resource identifier identifying a data resource which may be safely accessed by at most one server computing device at a time, (ii) retrieving an activation status for the resource identifier, by querying an activation database on the local network with the resource identifier, (iii) determining the resource identifier (and the associated data resource) is in a deactivated status for the local network using the retrieved activation status, (iv) broadcasting, using the high latency network interface, a broadcast request to the at least one external DACD, the broadcast request including the resource identifier, (v) receiving, using the high latency network interface, an activation transfer message including the resource identifier, (vi) updating the activation status for the resource identifier (and thus the associated data resource) in the database to an activated status for the local network, and (vii) transmitting a proceed message, using the local network interface, to at least one server computing device, the proceed message including the resource identifier.

The resulting technical benefits achieved by the systems and methods of the disclosure include at least one of: (i) reduced messaging across high latency network connections, (ii) reduced dependency on high latency messages to safely access data resources, (iii) accommodating multiple types of requests/and responses, (iv) accommodating multiple types of data resources, and (v) reduced processing time to access data resources.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. Payment cards may be identified by a primary account number (PAN).

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS"s include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 illustrates an exemplary distributed access computing device (DACD) system that includes, for example purposes, two local networks 110, and 120. In the example embodiment, the high latency connection 140 is a satellite-based data link. Although only two local networks and one high latency connection are shown herein for example purposes, the systems and processes described herein could include many more of each.

DACD 112 is connected to network 110, and high latency connection 140. DACD 112 is in communication with activation database 114. Network 110 includes at least one server 118, and multiple client computing devices 116. Notably, network 110 may include multiple instances of server 118. In other words, conventional distributed system technologies may be implemented within network 110, allowing for multiple instances of server 118. DACD 112 is configured to operate at the network level (e.g., network 110), such that traffic across the high latency connection 140 is minimized.

In the example embodiment, server 118 receives requests from client computing devices 116 over network 110, and generates responses. Each request is dependent on at least one data resource (e.g., a database record, a collection of database records), which must be accessed/modified by server 118 to process the request. DACD 112 is configured to control access to data resources by server 118 while minimizing processing delays due the high latency connection with the other DACDs.

Network 120 includes DACD 122 and activation database 124. Network 120 further includes at least one server 128, and client computing devices 126.

In one embodiment, server 118 and server 128 may be payment processing network computing devices that processes payment transactions. Client computing devices 116, 126 may include merchant point of sale systems, transaction processors, and other user computing devices. Servers 118, 128 are each configured to receive authorization messages from client computing devices 116, 126, and generate authorization responses. For example, servers 118, 128 may be used in authorizing payment card transactions.

Notably, payment card transactions are authorized using authorization messages. The DACD stores an activation status for resource identifiers, and may generate activation messages.

In this embodiment, payment accounts, identified by primary account numbers (PANs), are a data resource that DACDs 112, 122 control access to. More specifically, DACDs control access to payment accounts by maintaining an activation status for each PAN on each local network 110, 120. The operation of DACDs will be further detailed in FIG. 2.

The payment network is used as an example combination of server and client devices on network 110, 120, and to illustrate the functionality of DACDs 112, 122. DACDs 112, 122 may be configured to control access to any type of data resource based on resource identifiers.

FIG. 2 is a simplified block diagram illustrating a processing request 203 being processed by DACD 112. In the example embodiment, DACD 112 receives request 203 from client computing device 202 over network 110. Request 203 may be a payment card transaction (e.g., an authorization request message, ISO 8583 message). Request 203 may include resource identifier 204, such as a PAN.

DACD 112 is configured to control access to a data resource identified by resource identifier 204. Notably, DACD 112 does not need to have knowledge of where and how the data resource is stored. DACD 112 queries activation database 114 with resource identifier 204. Activation database 114 stores activation status 208 for resource identifier 204. Activation status 208 is specific to network 110. Activation status 208 indicates where the data resource associated with resource identifier 204 is activated, and thus accessible, or deactivated, and thus inaccessible.

Figure 3:
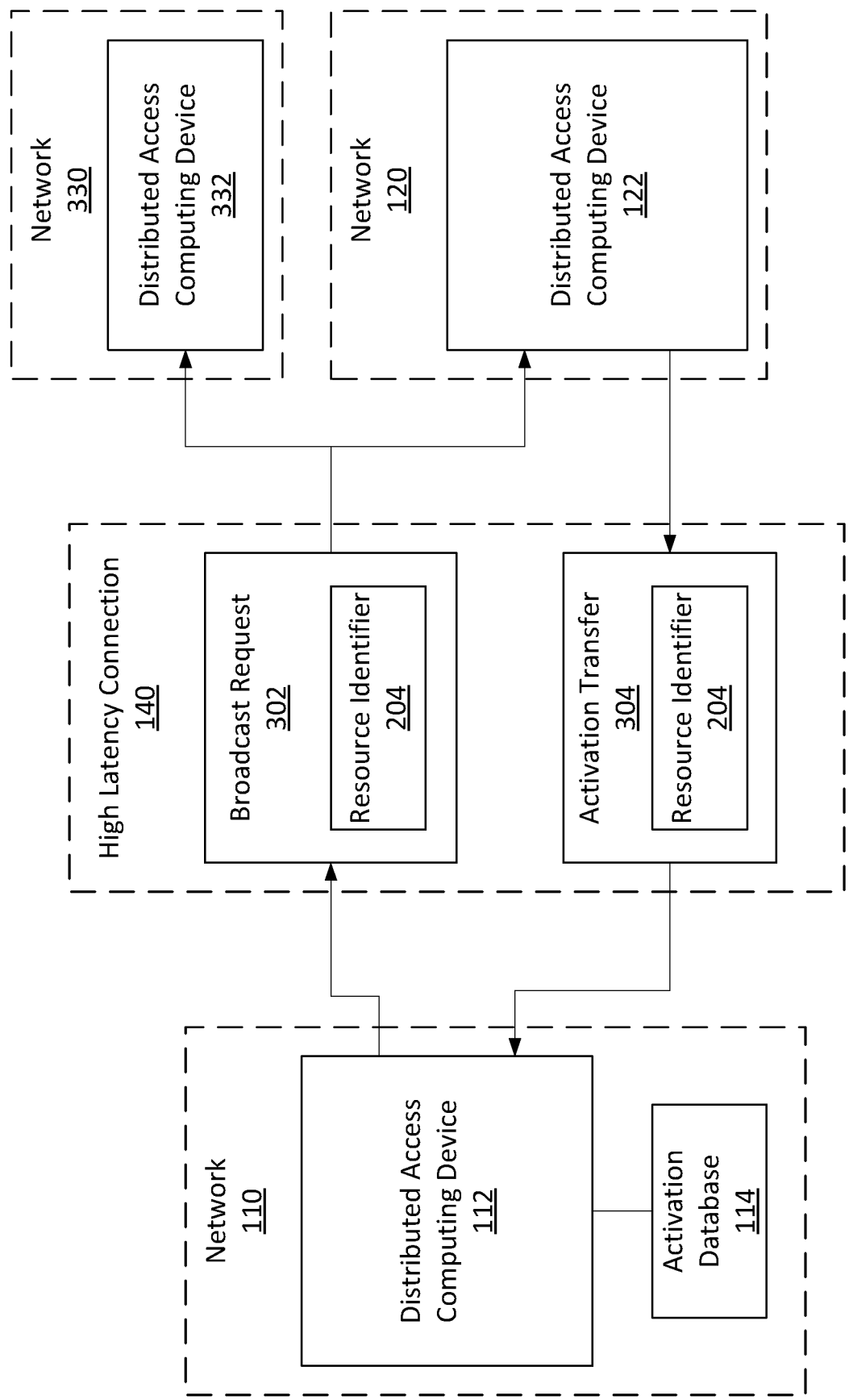
FIG. 3 is a simplified block diagram illustrating an example network data flow for the DACD system shown in FIG. 1.

If activation status 208 indicates resource identifier 204 is activated (e.g., enabled) for network 110, DACD 112 transmits proceed message 206 to API server 118. If DACD determines activation status 208 indicates resource 204 is deactivated (e.g., disabled) for network 110, DACD 112 automatically attempts to obtain activation for resource identifier 204. The operation of DACD 112 to obtain activation of a resource identifier is illustrated in FIG. 3. After DACD 112 obtains activated status for the resource identifier, DACD 112 transmits proceed message 206 to API server 118.

Overall, DACD 112 automatically obtains activated status for resource identifier 204, when necessary (e.g., the resource identifier has disabled/deactivated status), before transmitting proceed message 206 to server 118.

DACD 112 may store request 203 while awaiting activated status for resource identifier 204. In the example embodiment, DACD 112 stores request 203 in queue 210. Queue 210 is a queue data structure stored in a memory device of DACD 112. DACD 112 may receive additional requests associated with resource identifier 204 before activated status is obtained. Thus, DACD 112 may store, or "enqueue", the additional requests in queue 210. Once DACD 112 obtains activated status for resource identifier 204, it automatically dequeues (e.g., retrieves then deletes) request 203 from queue 210. DACD 112 may further dequeue any other requests associated with resource identifier 204.

Proceed message 206 initiates processing of request 203 at server 118. Server 118 accesses/modifies data resources associated with resource identifier 204. Proceed message 206 may include request 203, where DACD 112 initially received request 303 from client computing device 202 (e.g., where request 203 was not forwarded from API server 118). Additionally or alternatively, server 118 may store request 203. Proceed message 206 may not include request 203 when request 203 was forwarded to DACD 112 by server 118. In other words, server 118 may store requests before they are forwarded to DACD 112, such that proceed messages do not need to include the request.

FIG. 3 illustrates an example operation of DACD 112 when obtaining enabled activation status for a resource identifier. DACD 112, as shown in FIG. 3, determines that network 110 is not enabled/activated for resource identifier 204. The DACD 112 is also configured to obtain enabled activation status for resource identifier 204, before allowing the processing of requests dependent on resource identifier 204 by servers on network 110.

In the example embodiment, DACD 112 transmits broadcast request 302 including resource identifier 204, using high latency connection 140. High latency connection 140 may be a satellite data link, including two ground stations and a geospatial data satellite. High latency connection 140 may also be a satellite network, including multiple satellite data links. High latency connection 140 may include a terrestrial microwave link, including two ground stations. In some embodiments, high latency connection 140 may be an interplanetary data connection implemented with a satellite network.

Broadcast request 302 is received by any number of DACDs external to DACD 112. In the example embodiment, two DACDs 122, 332 receive broadcast request 302.

DACD 332, on network 330, also receives broadcast request 302. DACD 332 determines that network 330 is not activated/enabled for resource identifier 204, and stops processing broadcast request 302.

DACD 122, on network 120, receives broadcast request 302. DACD 122 determines that network 120 has enabled activation status for resource identifier 204. DACD 122 automatically transitions to disabled activation status for resource identifier 204, and generates authorization transfer 304. DACD 122 transmits authorization transfer 304 to DACD 112 using high latency connection 140. Authorization transfer 304 includes resource identifier 204, and indicates DACD 112 can safety transition to enabled activation status for resource identifier 204.

DACD 112, in response to receiving authorization transfer 304, performs an update by changing the activation status of resource identifier 204 in activation database 114 to enabled. DACD 112 may further transmit a proceed response to a server on network 110, as shown in FIG. 2. The proceed response initiates processing of requests dependent on resource identifier 204 by servers on network 110.

Figure 4:
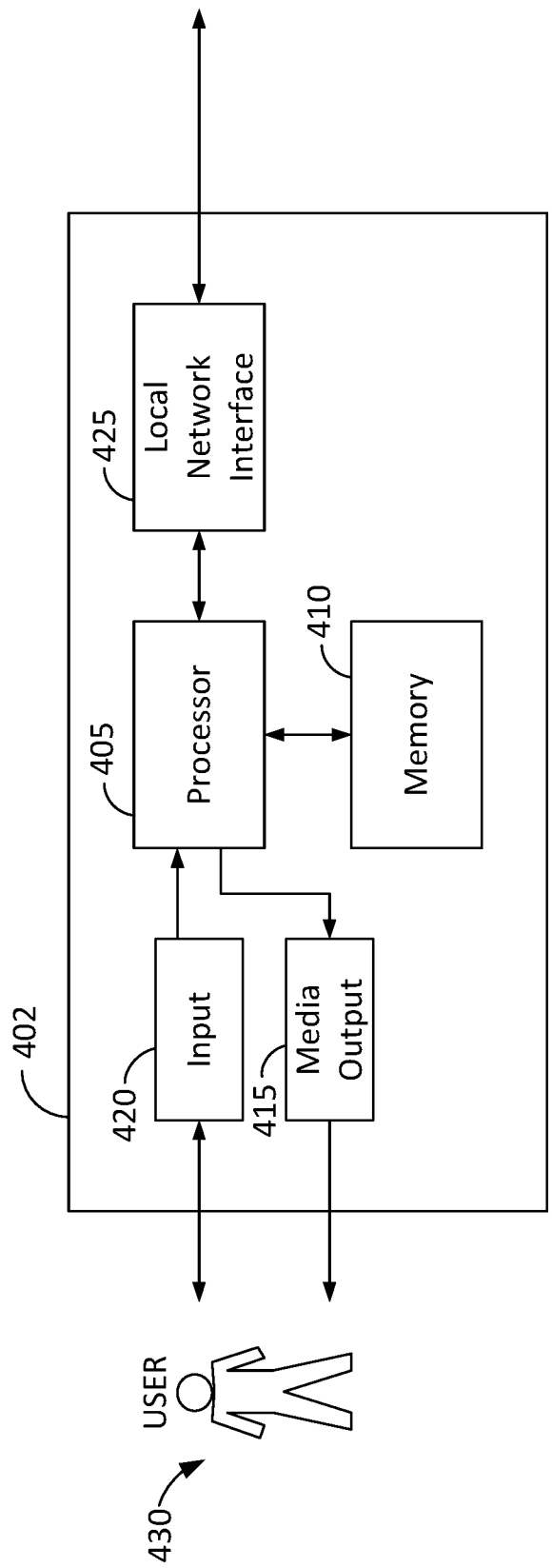
FIG. 4 illustrates an example configuration of a client computing device included in the DACD system the system shown in FIG. 1.

FIG. 4 depicts an exemplary client computing device 402 that may be used to implement server 118 or client computing devices 116 (shown in FIG. 1). Computing device 402 includes a processor 405 for executing instructions. In some embodiments, executable instructions are stored in a memory area 410. Processor 405 includes one or more processing units (e.g., in a multi-core configuration). Memory area 410 is any device allowing information such as executable instructions and/or other data to be stored and retrieved. Memory area 410 includes one or more computer-readable media.

In some embodiments, computing device 402 also includes at least one media output component 415 for presenting information to a user 430. Media output component 415 is any component capable of conveying information to user 430. In some embodiments, media output component 415 includes an output adapter, such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 is configured to present an interactive user interface (e.g., a web browser or client application) to user 430.

In some embodiments, computing device 402 includes an input device 420 for receiving input from user 430. Input device 420 includes, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 also includes a communication interface 425, which is communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and a client application. Web browsers enable users 430 to display and interact with media and other information typically embedded on a web page or a website from a web server. A client application allows users 430 to interact with a server application associated with.

In some embodiments, computing device 402 is configured to generate and transmit requests using communication interface 425. For example, a user may request a website. More specifically, computing device 402 may be configured to generate API requests. API requests, in the example embodiment, include a resource identifier and a function identifier. The function identifier (e.g., HTTP request type) indicates an operation to be performed by a server, and the operation is to be performed on a data resource identified by the resource identifier. In one embodiment, computing device 402 generates payment card transaction messages, such as authorization request messages.

In other embodiments, computing device 402 may be configured to receive requests and generate responses. For example, computing device 402 may be a web server, and respond to requests for webpages. Overall, computing device 402 may receive a request including a resource identifier and a function identifier. Computing device 402 may further execute stored instructions in response to the function identifier. Computing device 402, in executing the stored instructions, may further modify and/or access data resources associated with the resource identifier. Generally, computing device 402 may implement an API. In one embodiment, computing device 402 implements a payment network API. Computing device 402 may receive payment card transaction messages, and generate authorization responses based on stored instructions. For example, computing device 402 may access and modify a stored account balance (e.g., a data resource) associated with a payment card, while processing a payment card transaction message (e.g., a request). Computing device 402 may subsequently generate an authorization response.

Notably, the DACD system is not tied to a specific request/response structure. However, computing device 402 may be configured to implement payment transaction card originated interchange messaging (e.g., authorization request messages, authorization response messages), as described in ISO-8583 and ISO 20022. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs payment transaction card originated messages and further defines acceptable message types, data elements, and code values associated with such payment transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

Figure 5:
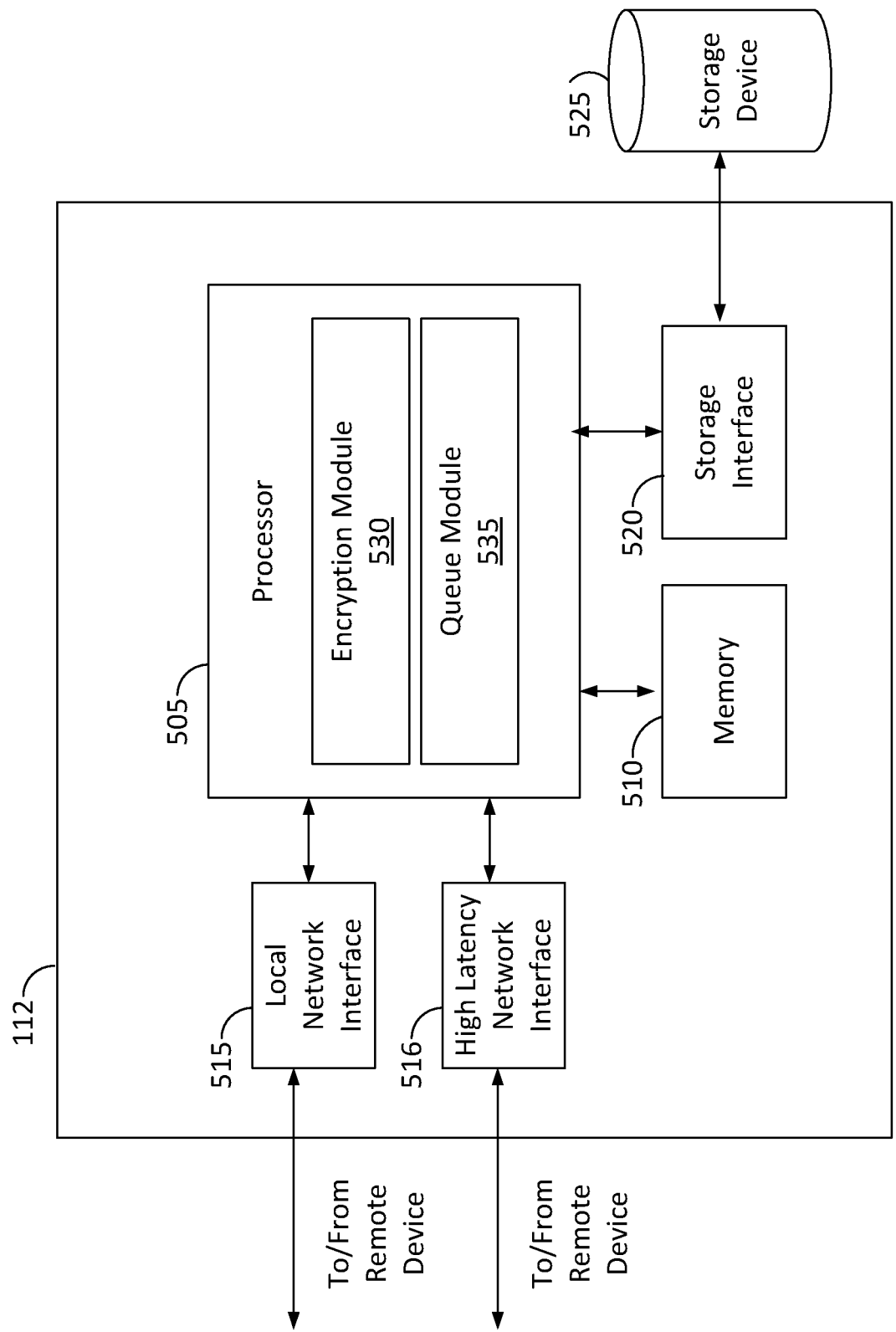
FIG. 5 is a schematic diagram of an example server computing device included in the DACD system shown in FIG. 1.

FIG. 5 depicts an example configuration of a distributed access computing device (DACD) 112 that includes processor 505 for executing instructions. Processor 505 is a component of DACD 112, as shown in the DACD system of FIG. 1. Processor 505 executes instructions in a memory area 510, for example. Processor 505 includes one or more processing units (e.g., in a multi-core configuration). Processor 505 is further operable to execute encryption module 530 and queue module 535. Modules 530 and 535 may include specialized instruction sets, coprocessors, and/or kernel extensions.

Encryption module 530 is configured encrypt/decrypt data, such as authorization requests and responses. Encryption module 530 may be configured to encrypt and decrypt data based on public and/or private keys. For example, requests may be encrypted using a RSA (Rivest-Shamir-Adelman) encryption public key. Responses may further be signed with a private. In another example, data stored in storage device 525 may be encrypted using AES (Advanced Encryption Standard) encryption. In some embodiments, encryption module 530 includes specialized processor instructions configured to encrypt/decrypt data. In another embodiment, encryption module 530 may include an encryption/decryption optimized coprocessor connected to processor 505.

Queue module 535 is configured to store and retrieve requests in a queue data structure, and the queue data structure is in memory 510. Queue module 535 enqueues received requests, where activation status for the associated resource identifier has not yet been obtained. The requests may be received using local network interface 515. Queue module 535 is configured to dequeue (e.g., retrieve from memory and subsequently delete) requests in response to receiving activated status for the associated resource identifier. Processor 505 may transmit the retrieved requests to server computing devices using local network interface 515. In other words, queue module 535 stores requests until it is safe to process them.

Processor 505 is operatively coupled to a local network interface 515. Local network interface 515 is configured to enable DACD 112 to communicate with device(s) such as server 118 and client computing devices 116 (shown in FIG. 1). In certain embodiments, local network interface 515 is associated with a respective network address, such as an IP ("internet protocol") address. In other embodiments, communication interface 515 is associated with physical network links. For example, communication interface 515 may receive network packets from remote devices via Ethernet, using a switching device.

Processor 505 is operatively coupled to a high latency network interface 516. For example, processor 505 may be coupled to a microwave or laser based communication network, such as a satellite network. High latency network interface 516 may or may not have an IP address. High latency network interface 516 provides a high latency connection to external DACD devices, such as DACD 122 (shown in FIG. 1). Processor 505 is configured to operate high latency network interface 516 to transmit broadcast messages (e.g., messages received by all devices on the network), as shown in FIG. 3.

Processor 505 is operatively coupled to a storage device 525. Storage device 525 is any computer-operated hardware suitable for storing and/or retrieving data. In some embodiments, storage device 525 is integrated in DACD 112. For example, DACD 112 may include one or more hard disk drives as storage device 525. In other embodiments, storage device 525 is external to DACD 112. For example, storage device 525 may include multiple storage units such as hard disks or solid state disks in a redundant array of inexpensive disks (RAID) configuration 525 may include a storage area network (SAN) and/or a network attached storage (NAS) system.

In some embodiments, Processor 505 is operatively coupled to storage device 525 via a storage interface 520. Storage interface 520 is any component capable of providing Processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525. The data storage interface examples provided herein are for example purposes only, and thus, are not intended to limit in any way the definition and/or meaning of the term storage interface.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
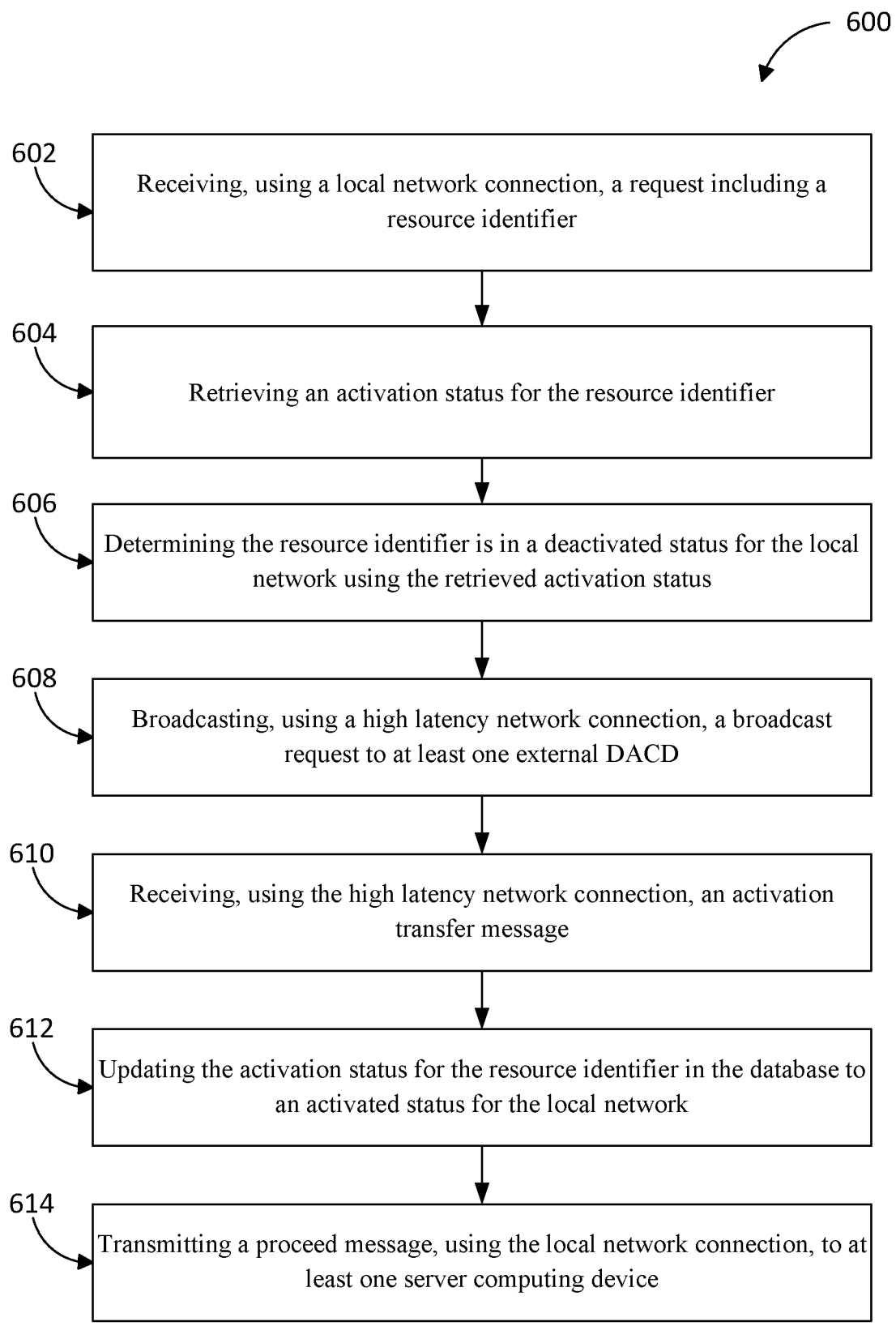
FIG. 6 is a flowchart illustrating an example method for network latency management using the DACD system shown in FIG. 1.

FIG. 6 is a flowchart illustrating an example method 600 for network latency management, implemented using DACD system 100 shown in FIG. 1. More specifically, FIG. 6 illustrates DACD 112 (shown in FIG. 1) receiving a request including a resource identifier, determining that the resource identifier is deactivated for the associated local network, and obtaining activated status using a broadcast message. Method 600 may be implemented using at least one computing device, for example, DACD 112.

In the example embodiment, method 600 includes receiving 602, using a local network interface (e.g., network 110 shown in FIG. 1), a request (e.g., request 203 shown in FIG. 2) that includes a resource identifier, wherein the resource identifier identifies a data resource which may be safely accessed/modified by at most one server computing device at a time. Method 600 further includes retrieving 604 an activation status for the resource identifier, by querying an activation database (e.g., activation database 114 shown in FIG. 1) on the local network with the resource identifier, and determining 606 the resource identifier is in a deactivated status for the local network using the retrieved activation status.

Method 600 further includes, in response to determining 606, broadcasting 608, using the high latency network interface (e.g., high latency connection 140 shown in FIG. 1), a broadcast request (e.g., broadcast request 302 shown in FIG. 3) to the at least one external DACD wherein the broadcast request includes the resource identifier, and receiving 610, using the high latency network interface, an activation transfer message that includes the resource identifier. Method 600 also includes updating 612 the activation status for the resource identifier in the database to an activated status for the local network, and transmitting 614 a proceed message, using the local network interface, to at least one server computing device wherein the proceed message includes the resource identifier.

In some embodiments, method 600 includes additional and/or alternative steps in accordance with the capabilities of the DACD system as described herein.

Figure 7:
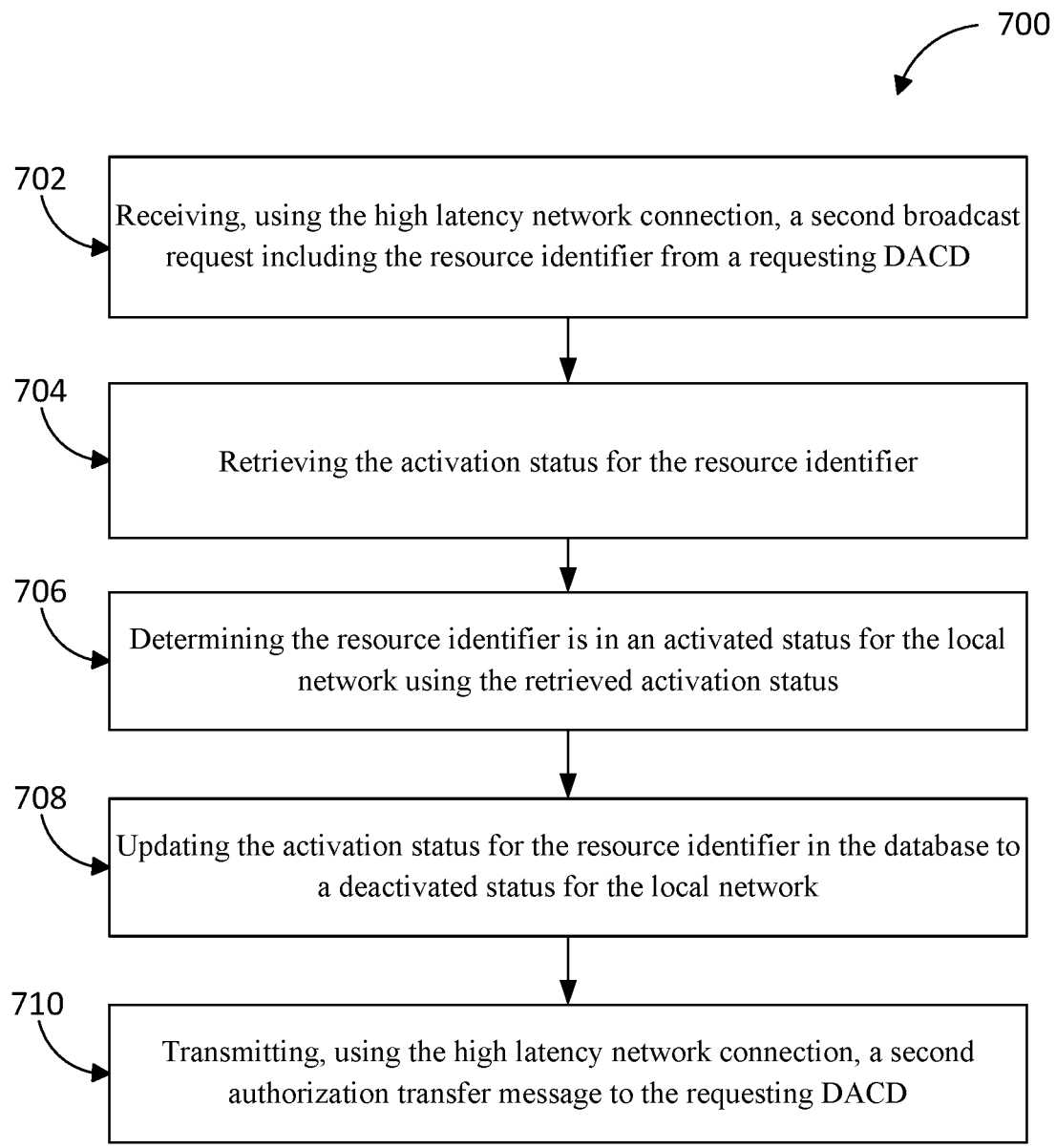
FIG. 7 is a flowchart illustrating an example method for network latency management using the DACD system shown in FIG. 1.

FIG. 7 is a flowchart illustrating an example method for network latency management, which may be implemented using the DACD system shown in FIG. 1. More specifically, method 700 illustrates DACD 112 (shown in FIG. 1) receiving and processing a broadcast message to transfer activation status for a resource identifier. In other words, method 700 illustrates DACD 112 transitioning to a deactivated status for a resource identifier. Method 700 may be implemented using at least one computing device, for example, DACD 112 (shown in FIG. 1).

In the example embodiment, method 700 includes receiving 702, using the high latency network interface, a second broadcast request (also referred to as an activation transfer request message) that includes the resource identifier from a requesting DACD, retrieving 704 the activation status for the resource identifier by querying the activation database on the local network with the resource identifier, and determining 706 the resource identifier is in an activated status for the local network using the retrieved activation status. Method 700 further includes updating 708 the activation status for the resource identifier in the database to a deactivated status for the local network, and transmitting 710, using the high latency network interface, an authorization activation transfer message that includes the resource identifier to the requesting DACD.

Figure 8:
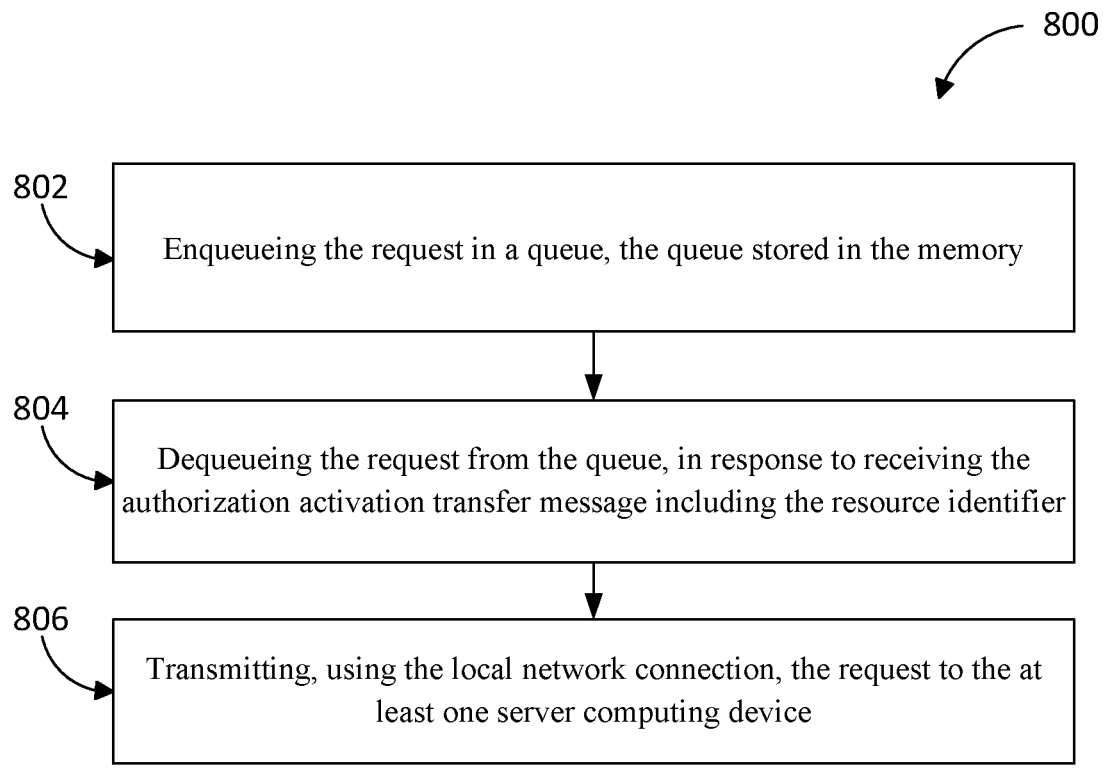
FIG. 8 is a flowchart illustrating an example method for storing requests and network latency management using the DACD system shown in FIG. 1.

FIG. 8 is a flowchart illustrating an example method for storing requests and network latency management, which may be implemented using the DACD system shown in FIG. 1. Method 800 may be implemented using at least one computing device, for example, DACD 112 (shown in FIG. 1). Method 800 includes enqueueing 802 the request in a queue wherein the queue is stored in the memory, dequeueing 804 the request from the queue in response to receiving the authorization activation transfer message that includes the resource identifier, and transmitting 806, using the local network interface, the request to the at least one server computing device.

Figure 9:
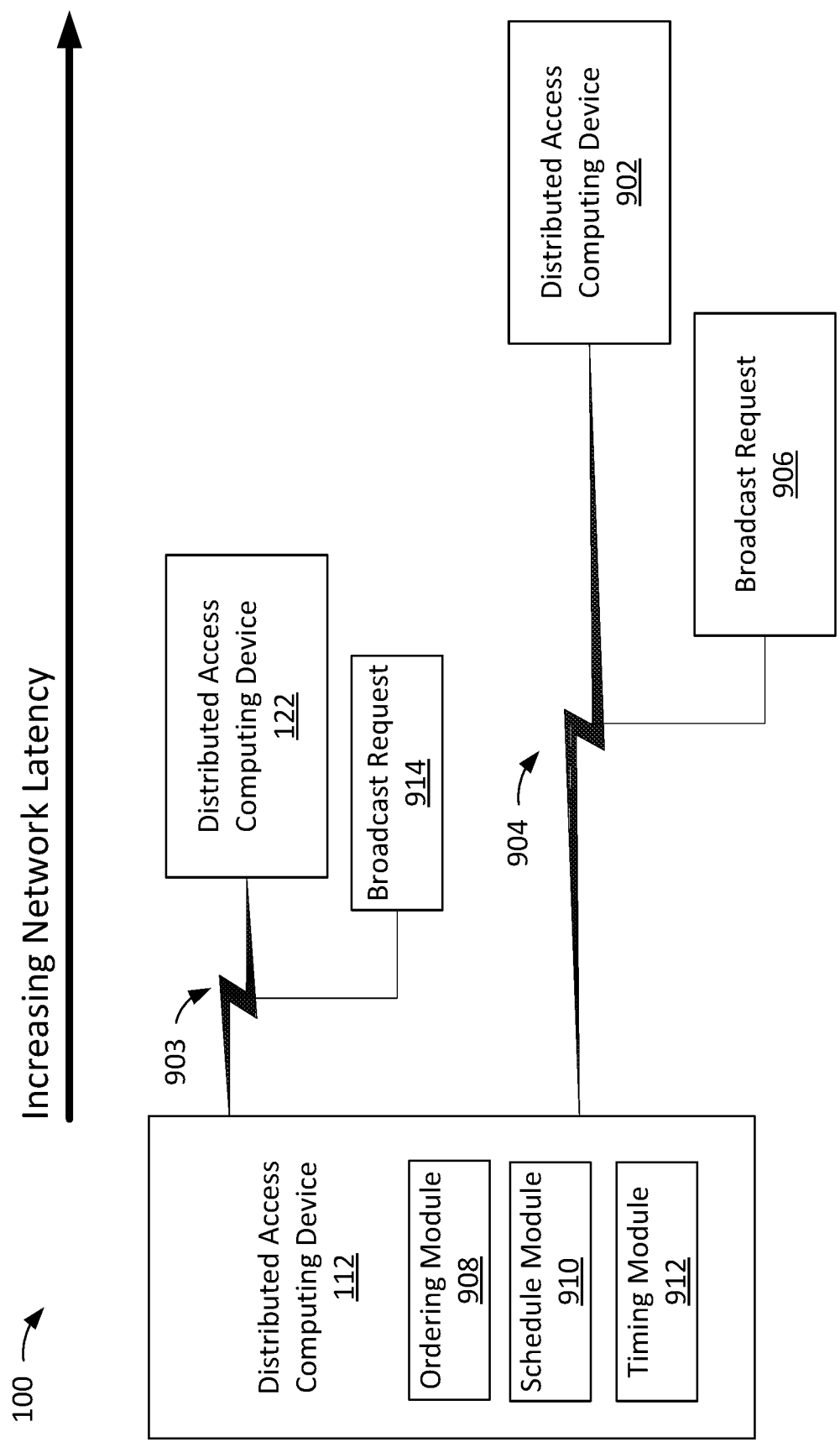
FIG. 9 is a simplified block diagram illustrating multiple DACDs and high latency connections.

FIG. 9 illustrates an additional technical problem associated with high latency distributed networks. In some high latency distributed networks, an ordering problem may arise in networks that include connections with different magnitudes of network latency. An example network configuration that includes connections 903 and 904 is provided in FIG. 9.

In FIG. 9, communication connection 903, between DACD 122 and DACD 112, has moderately high latency (e.g., less than 1 minute but more than a second). For example, connection 903 may have a minimum latency of 1 second, 3 seconds, and the like. Connection 904, between DACD 902 and 112, has an extremely high latency (e.g., greater than 1 minute). As described in FIG. 3, at most one of DACDs 112, 122, and 902 may be activated for a specific resource identifier at one time. DACDs may request activation by transmitting broadcast request messages.

In the example embodiment, DACD 112 is activated for a first resource identifier. DACD 112 and 902 each generate a broadcast request message to request activation for the first resource identifier. DACD 122 transmits broadcast request 914 to DACD 112 using connection 903. DACD 902 transmits broadcast request 914 to DACD 112 using connection 904. In the example embodiment, DACD 112 always receives broadcast request 914 before broadcast request 906. Consequently, activation status may be passed between DACD 112 and 122, before DACD 112 receives broadcast request 906 from DACD 902. In other words, DACD 902 may be unable to 'interject', or reach DACD 112, before DACD 122 obtains authorization.

At least two embodiments are described herein for addressing the ordering problem. However, this disclosure is not intended to be limited by the descriptions of these embodiments. In a first embodiment, DACD 112 includes schedule module 910. DACDs 122 and 902 may further include a schedule module. Schedule module 910 is configured to sequentially activate DACDs (e.g., DACD 112) for multiple resource identifiers. In other words, schedule module 910 may cause activation status for multiple resource identifiers to 'rotate' between all DACDs, using a predefined schedule. For example, schedule module 910 may sequentially activate each DACD for ten minutes every 24 hours. Each DACD may be activated for between one minute and one hour, and the sequential process may happen every hour to every 24 hours. Thus, each DACD becomes activated for all (or at least a portion of) resource identifiers on a rolling basis. The predefined schedule ensures at most one DACD is activated at a time, regardless of the network latency conditions. The predefined schedule, implemented by schedule module 910, further ensures that each DACD may obtain activation status.

In a second embodiment, broadcast request messages may further include priority or ordering data, and DACDs may include a timing module and an ordering module (e.g., DACD 112 include timing module 912 and an ordering module 908). In this embodiment, a DACD waits to act on a received broadcast message, such that multiple broadcast requests may be received. The DACD then decides which of the received broadcast requests to respond to based, at least in part, on the ordering data.

DACD 112 receives broadcast request 914 from DACD 122. DACD 112, including timing module 912, may wait for a delay period after receiving broadcast request 914. The delay period, in the example embodiment, is the largest known network latency time of each external DACD relative to DACD 112. Timing module 912 may store the network latency for each external DACD relative to DACD 112. DACD 112 receives broadcast request 906 from DACD 902 during the delay period. Thus, DACD 112 has received two broadcast requests, 914 and 906. Timing module 912 may prematurely stop the delay period when a broadcast request is received from the furthest DACD. Without timing module 912, DACD 112 would receive broadcast request 906 after already processing broadcast request 914. DACD 112 uses ordering module 908 to determine which of the received broadcast requests to process (e.g., to which external DACD to send the activation transfer 304 depicted in FIG. 3).

The ordering module 908 receives and logs broadcast requests for each resource identifier continuously, even when the resource identifier is not in an activated status on the associated local network. The ordering module 908 queues these broadcast requests in the order in which they were received from each external DACD. Once a broadcast request from a certain DACD is received and queued, no future broadcast requests from such DACD will be logged in the ordering module 908. In this way, the ordering data in the ordering module does not contain more than one broadcast requests originated by a specific external DACD for a certain resource identifier.

Once DACD 112 receives an activation transfer message for a resource identifier and sets the activation status of such resource identifier to activated, it utilizes the timing module 912 to process any broadcast requests. While the resource identifier is in activated status, the ordering module continues to log and queue broadcast requests (e.g., broadcast requests 914 and 906) in the manner described above. When the timing module 912 indicates that DACD 112 can send an activation message for the resource identifier, DACD 112 will send such message to the DACD identified as first in the queue logged by the ordering module 908. In addition, the activation transfer message will contain the ordering data of the remaining DACD identifiers to be passed on to the external DACD. When this external DACD receives the activation transfer message, it will then process the ordering data in such message with such DACD's ordering module and update its ordering queue with any DACD identifiers not already contained in such queue. When a broadcast request is received by such DACD in the future, it will in turn send the ordering data with the activation transfer onward to the next DACD in queue and so on. This process ensures that broadcast requests from all DACDs are acted upon regardless of latency between DACDs.

Figure 10:
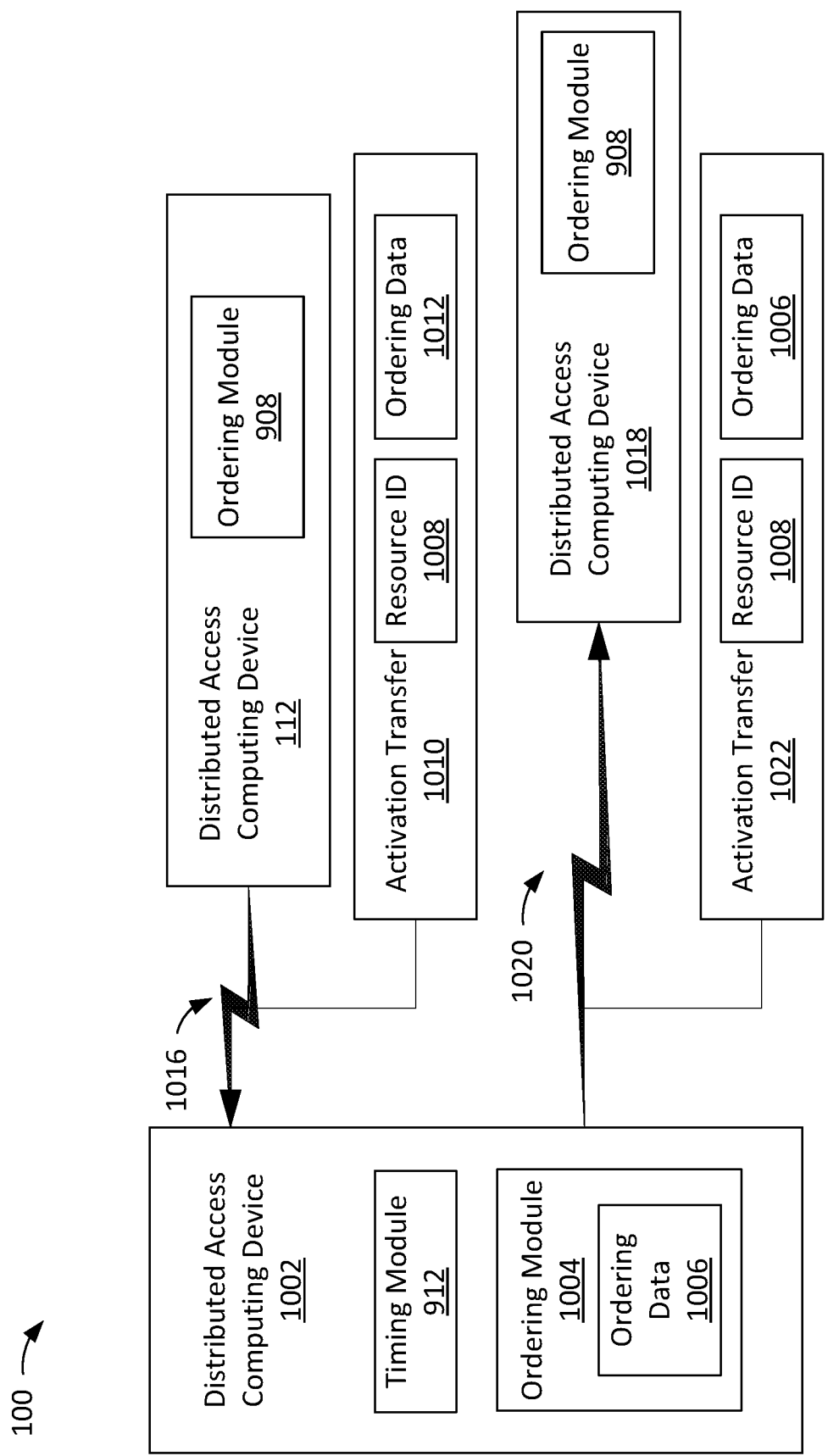
FIG. 10 is a simplified block diagram illustrating multiple DACDs and ordering data.

FIG. 10 is a simplified block diagram illustrating multiple DACDs and ordering data. More specifically, FIG. 10 illustrates an ordering module and ordering data. DACD 1002 is connected to DACD 112 and DACD 1018 via high network latency connections 1016 and 1020, respectively. The ordering module 1004 of DACD 1002 contains ordering data 1006 (e.g., the queue of DACD identifiers who have sent broadcast requests for a certain resource identifier) for resource identifier 1008, whose activation status is deactivated at this time. DACD 1002 has sent out a broadcast request for resource identifier 1008 and is awaiting an activation transfer. DACD 1002 receives the activation transfer 1010 for resource identifier 1008 from DACD 112. The activation transfer 1010 also contains ordering data 1012 from the ordering module 908 of DACD 112. DACD 1002 processes the activation transfer and updates ordering data 1006 with the additional information from ordering data 1012. The updated ordering data indicates that DACD 1018 is next in queue to receive an activation request for resource identifier 1008. Once DACD 1002 has completed processing of the data resource with resource identifier 1008, and based on timing indicated by the timing module 1014, DACD 1002 sends an activation transfer message 1022 to DACD 1018 for resource identifier 1008 with ordering data 1006. DACD 1018 records and processes ordering data 1006 with its ordering module 1024.

In certain embodiments, the ordering module may order the broadcast requests in the order in which they were received. In other embodiments, the ordering module may order the data in the order of decreasing network latency between the ordering module's DACD and the external DACDs sending broadcast requests.

In certain embodiments, resource identifiers may be limited to at most two DACDs, as another solution to the ordering problem. For example, data resources may be limited to at most two local area networks.

As will be appreciated based on the foregoing specification, the above-described embodiments of the disclosure is implemented using computer programming or engineering techniques including computer software, firmware, hardware or any combination or subset thereof, wherein the technical effects described above are achieved. Any such resulting program, having computer-readable code means, is embodied or provided within one or more computer-readable media, thereby making a computer program product, (i.e., an article of manufacture), according to the discussed embodiments of the disclosure. The computer-readable media is, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code is made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A distributed access computing device (DACD) for controlling access to data resources in a high latency network, said DACD comprising:
    a remote network interface connecting the DACD with a remote network, the remote network including at least one external DACD, and having a high latency connection;
    a local network interface connecting the DACD with a local network, the local network including at least one server and client computing device, communications with the local network having a low latency connection, having a lower latency than communications with the high latency connection of the remote network; and
    a processor and a memory in communication with the processor, the processor programmed to:
        receive, using the local network interface, a request including a resource identifier, the resource identifier identifying a data resource which may be safely accessed by at most one server computing device at a time;
        query an activation database on the local network with the resource identifier to determine that the resource identifier is in a deactivated status for the local network;
        broadcast, using the high latency connection of the remote network interface, a broadcast request to the at least one external DACD, the broadcast request including the resource identifier; and
        update, using the high latency connection, an activation status for the resource identifier in the activation database to an activated status for the local network after receiving an activation transfer message from the remote network.

2. The DACD in accordance with claim 1, wherein the processor is further programmed to:
    enqueue the request in a queue, the queue stored in the memory;
    dequeue the request from the queue, in response to receiving the activation transfer message including the resource identifier; and
    transmit, using the local network interface, the request to the at least one server computing device.

3. The DACD in accordance with claim 1, wherein the processor is further programmed to:
    receive, using the remote network interface, a second broadcast request including the resource identifier from a requesting DACD;
    retrieve the activation status for the resource identifier by querying the activation database on the local network with the resource identifier;
    determine the resource identifier is in an activated status for the local network using the retrieved activation status;
    update the activation status for the resource identifier in the database to a deactivated status for the local network; and
    transmit, using the remote network interface, a second authorization transfer message including the resource identifier to the requesting DACD.

4. The DACD in accordance with claim 1, wherein the remote network interface establishes an optical wireless connection to a satellite.

5. The DACD in accordance with claim 1, wherein the remote network interface establishes a point-to-point microwave wireless connection.

6. The DACD in accordance with claim 1, wherein the DACD is a component of a payment processing network, and the request includes a payment transaction authorization request message.

7. The DACD in accordance with claim 6, wherein the resource identifier includes a primary account number (PAN), and the data resource includes payment account data.

8. The DACD in accordance with claim 1, wherein the remote network interface has a minimum latency of one second for communications between the DACD and the at least one external DACD.

9. The DACD in accordance with claim 1, wherein the processor is further programmed to transmit a proceed message, using the local network interface, to at least one server computing device, wherein the proceed message includes the resource identifier.

10. A non-transitory computer readable storage media having computer-executable instructions embodied thereon, wherein when executed by a distributed access computing device (DACD) having a processor coupled to a memory, the computer-executable instructions cause the processor to:
receive, using a local network interface that connects the DACD to a local network having at least one server and client computing device, a request including a resource identifier, the resource identifier identifying a data resource which may be safely accessed by at most one server computing device at a time on the local network, wherein the local network has a low latency connection;
query an activation database on the local network with the resource identifier to determine that the resource identifier is in a deactivated status for the local network;
broadcast, using a high latency connection of a remote network interface that has a higher latency than the low latency connection, that connects the DACD to a remote network that includes at least one external DACD, a broadcast request to the at least one external DACD, the broadcast request including the resource identifier; and
update, using the high latency connection, an activation status for the resource identifier in the activation database to an activated status for the local network after receiving an activation transfer message from the remote network,
wherein communications between the DACD and the local network have a lower latency then communications between the DACD and the remote network.

11. The non-transitory computer readable storage media of claim 10, wherein the computer-executable instructions further cause the processor to:
enqueue the request in a queue, the queue stored in the memory;
dequeue the request from the queue, in response to receiving the activation transfer message including the resource identifier; and
transmit, using the local network interface, the request to the at least one server computing device.

12. The non-transitory computer readable storage media of claim 10, wherein the computer-executable instructions further cause the processor to:
receive, using the remote network interface, a second broadcast request including the resource identifier from a requesting DACD;
retrieve the activation status for the resource identifier by querying the activation database on the local network with the resource identifier;
determine the resource identifier is in an activated status for the local network using the retrieved activation status;
update the activation status for the resource identifier in the database to a deactivated status for the local network; and
transmit, using the remote network interface, a second authorization transfer message including the resource identifier to the requesting DACD.

13. The non-transitory computer readable storage media of claim 10, wherein the remote network interface establishes an optical wireless connection to a satellite.

14. The non-transitory computer readable storage media of claim 10, wherein the remote network interface establishes a point-to-point microwave wireless connection.

15. The non-transitory computer readable storage media of claim 10, wherein the DACD is a component of a payment processing network, and the request includes a payment transaction authorization request message.

16. The non-transitory computer readable storage media of claim 15, wherein the resource identifier includes a primary account number (PAN), and the data resource includes payment account data.

17. The non-transitory computer readable storage media of claim 10, wherein the remote network interface has a minimum latency of one second for communications between the DACD and the at least one external DACD.

18. The non-transitory computer readable storage media of claim 10, wherein the computer-executable instructions further cause the processor to transmit a proceed message, using the local network interface, to at least one server computing device, wherein the proceed message includes the resource identifier.

19. A distributed access computing system for controlling access to data resources in a high latency network, said distributed access computing system comprising:
a first distributed access computing device (DACD) having a local network interface connecting the first DACD with a first local network, the first local network including at least one server and client computing device;
a second DACD having a local network interface connecting the second DACD with a second local network, the second local network including at least one server and client computing device;
a remote network interface of the first DACD connecting the first DACD and the second DACD, wherein communications between the first DACD and the first local network have a low latency connection that has a lower latency than communications on a high latency connection between the first DACD and the second DACD; and
the first DACD including a processor and a memory in communication with the processor, the processor programmed to:
receive, from the first local network, a request including a resource identifier, the resource identifier identifying a data resource which may be safely accessed by at most one server computing device at a time;
query an activation database on the first local network with the resource identifier to determine that the resource identifier is in a deactivated status for the local network;
broadcast, using the high latency connection of the remote network interface, a broadcast request to the second DACD, the broadcast request including the resource identifier; and
update, using the high latency connection, an activation status for the resource identifier in the activation database to an activated status for the first local network after receiving an activation transfer message from the remote network.

20. The distributed access computing system in accordance with claim 19, wherein the second DACD includes a second processor and a second memory in communication with the second processor, the second processor programmed to:
receive, using the remote network interface, the broadcast request including the resource identifier from the first DACD;

retrieve the activation status for the resource identifier by querying the activation database on the second local network with the resource identifier;

determine the resource identifier is in an activated status for the second local network using the retrieved activation status;

update the activation status for the resource identifier in the database to a deactivated status for the second local network; and transmit, using the remote network interface, a second authorization transfer message including the resource identifier to the first DACD.

* * * * *